ABSTRACT OF THE DISCLOSURE

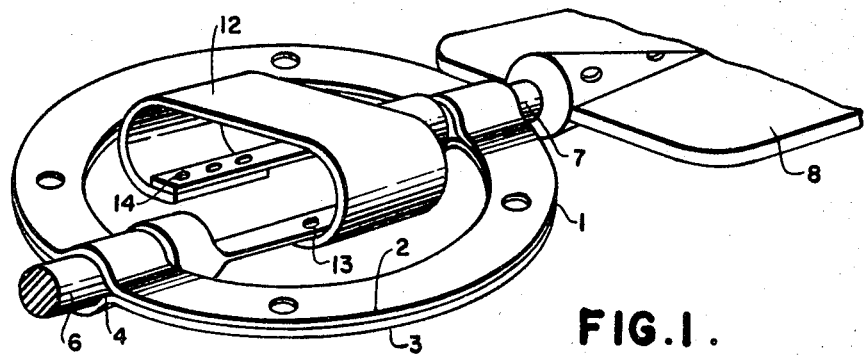
FIG.1.
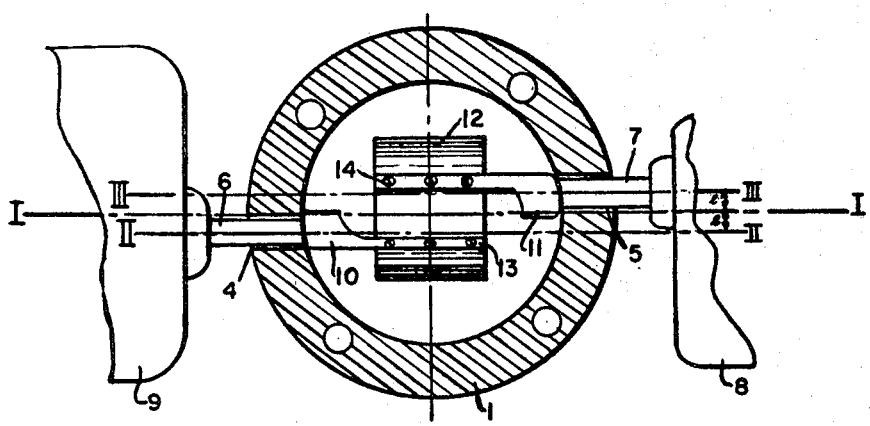
FIG.2.
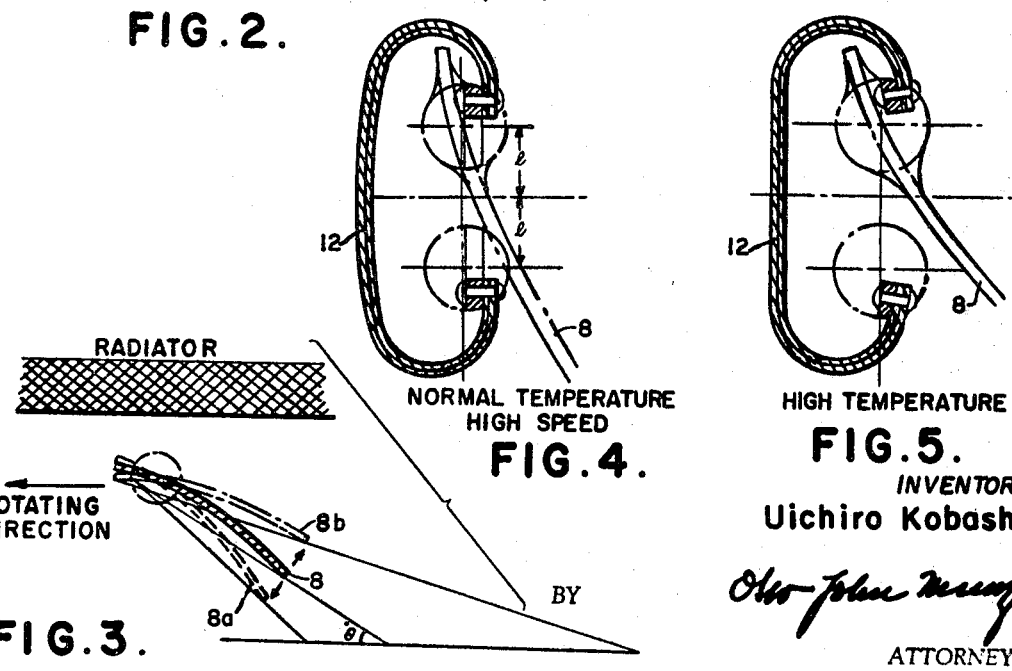
FIG.3.
FIG.4.
NORMAL TEMPERATURE HIGH SPEED
FIG.5.
HIGH TEMPERATURE
INVENTOR
Uichiro Kobashi
ATTORNEY 3,443,744
FAN APPARATUS FOR COOLING ENGINE
Uichiro Kobashi, Kariya-shi, Japan, assignor to
Aisin Seiki Kabushiki Kaisha
Filed Apr. 21, 1967, Ser. No. 632,607
Claims priority, application Japan, Apr. 21, 1966,
41/36,993
Int. Cl. F04d 25/14; F01p 7/02
U.S. Cl. 230—270     5 Claims

The disclosed fan apparatus for cooling an engine has a supporting boss, arms which are supported through holes formed at radially opposite sides of the supporting boss, fan blades which are secured to the outer ends of the arms, stoppers of the arms for preventing respective arms from separating outwards, fittings formed at one portion of the stoppers, and a spring bimetal secured to the fittings.

Background of the invention

This invention relates to a fan apparatus for cooling an engine, and more particularly is directed to a fan apparatus for cooling an engine which apparatus is provided with a bimetal with spring action for automatically varying its blade angle in response to the temperature and rotating speed of the engine.

Heretofore, the most conventional fan apparatus for cooling an engine has been provided with fan blades which were secured directly to the shaft of a cooling water pump which was rotated with the revolving shaft of the engine. Accordingly, the fan blade angle of such apparatus is always constant regardless of the temperature of the engine. The amount of its air flow is approximately proportional to the revolving speed of the engine, while the rotating speed of the fan blades is proportional to that of the engine. When the engine rotates at high speed, the fan blades of the engine also rotate at high speed. This causes the fan to produce more air flow than required for cooling the engine. This is particularly true at high speed operation of the engine and in the cold weather of winter this results easily in an overcooling of the engine. These fixed blade fans are generally designed to provide adequate cooling at maximum load in midsummer. Therefore, at other times, the engine is cooled more than required. This shortens the life of the engine and also causes the engine to operate usually at less power, with bad efficiency and a low accelerating characteristic.

Summary of the invention

This invention eliminates the abovementioned disadvantages of the conventional fan apparatus for cooling an engine and provides a new and improved fan apparatus for cooling an engine which varies the amount of its produced air flow in response to the temperature and speed of the engine.

In one aspect of the preferred embodiment of this invention so as to eliminate the above disadvantages, there is provided a supporting boss, arms which are supported through holes formed at radially opposite sides of the supporting boss, fan blades which are secured to the outer ends of the arms, stoppers of arms for preventing respective arms from separating outwards, fittings formed at one portion of the stoppers, and a bimetal secured to the fittings, whereby the angle of the fan blades is automatically controlled in response to the temperature of the engine and its speed.

In another aspect of the preferred embodiment of this invention so as to eliminate the abovementioned disadvantages, there is provided a supporting boss, a plurality of pairs of cylindrical holes which are formed at radially opposite sides of the boss and are parallel and not along one axis to each other, arms which are supported rotatably through the holes, fan blades which are secured to the outer ends of the arms, stoppers of the arms for preventing respective arms from separating outwards, fittings which are formed at innermost ends of the stoppers, and a bimetal which is secured to the fittings, whereby the angle of the fan blades is automatically controlled in response to the temperature and speed of the engine.

In further aspect of the preferred embodiment of this invention so as to eliminate the abovementioned disadvantages, there is provided a supporting boss, a plurality of pairs of cylindrical holes which are formed at radially opposite sides of the boss and are parallel and not along one axis to each other, arms which are supported rotatably through the holes, stoppers of the arms for preventing respective arms from separating outwards, fittings formed at innermost ends of the stoppers and a spring secured to the fittings, whereby the angle of the fan blades is automatically controlled in response to the temperature and speed of the engine.

According to one aspect of the present invention, one feature thereof is that the angle of the fan blades for cooling the engine of vehicles or automobiles is automatically adjusted in response to the rotating speed and temperature of the engine and the fan blows the amount of the flow of air depending on the requirement of the engine so that the temperature of the engine may be maintained constant, regardless of the speed of the engine or load or environmental conditions.

Another feature of the present invention is that the blades of cooling fan apparatus are adapted to vary such that their angle becomes small, when the rotational speed becomes high and the pressure difference between fore and aft of the fan becomes large. This force of the pressure difference is generally borne by a rigid-blade fan. However, in one aspect of this invention, the force is supported by a bimetal which operates as a spring and also deforms with change in the temperature of the engine. The bimetal is fixed at both ends to a pair of arms supported by a boss of the fan. The arms cannot rotate freely because of the rigidity of the bimetal. Also, the pair of arms is disposed symmetrically at the boss of the fan and is also disposed so as to be parallel and not to be on one axis. Further, a stopper is provided on other ends of the arms, such that the arms cannot fly out of the boss due to centrifugal force during rotation. And, the blades of the fan are secured to the outermost end of the arms in such a manner that the major portion of a blade's surface area trails its pivot axis during rotation. This makes the angle of the blades of the fan smaller as the pressure produced during rotation increases.

From the structural features described hereinbefore, further advantage of the present invention is effected in that when the speed of the rotation of the fan increases to high speed, the angle of the blades of the fan becomes small, because the spring strength of the bimetal is overcome by the twisting moment of the pressure created by the blades moving against the air. Further, at this time, when the temperature of the radiator disposed at its forward portion increases together with the engine temperature, the temperature of the fluid passing through the radiator and bimetal is increased whereby the angles of the blades become large. Conversely, when the temperature of the radiator lowers, the power loss becomes small and the fan becomes less noisy due to the small angle of the blades and small amount of air flow. In addition, when the temperature of the engine increases, an overheating is prevented by increasing the amount of the air flow. Also, when the speed of rotation of the engine decreases, the angle of the blades of the fan varies so as to increase depending upon the amount of the air flow therethrough, since the pressure produced at its starting is small. Accordingly, in case of the weather of a winter, at the starting of the engine, the fan may be adapted so as not to blow any air, or even relatively warm air in the engine room may be blown.

Therefore, one object of this invention is to provide a new and improved fan apparatus for cooling an engine by which the fluid flow for cooling the engine is automatically controlled in response to the temperature of the engine.

Another object of this invention is to provide a new and improved simple fan apparatus for cooling an engine which is low in cost and especially suited for the compact car.

A still further object of this invention is to provide a new and improved fan apparatus for cooling an engine by which the fluid flow for cooling the engine is automatically controlled in response to the speed of the engine.

Still another object of this invention is to provide a new and improved fan apparatus for cooling an engine in which the angle of its blades is automatically controlled in response to both the temperature and the speed of the engine.

Other objects and advantages of this invention will further become apparent hereinafter, and from the drawings.

*Brief description of the drawings*

FIG. 1 is a perspective view of an embodiment of this invention showing a bimetal and the mounting of the blades thereto;

FIG. 2 is a front view of another embodiment of this invention showing the arrangement of the respective components;

FIG. 3 is a schematic diagram showing the variation of blade angle in accordance with this invention; and FIGS. 4 and 5 are fragmental views of operational states of the bimetal and the angles of the blades in accordance with this invention.

*Description of the preferred embodiment*

Although specific forms of the invention have been selected for illustration in the drawings, and the following description is drawn in specific terms for the purpose of describing those forms of the invention, this description is not intended to limit the scope of the invention, which is defined in the claims.

Referring to the drawings, and particularly to FIGS. 1 and 2, a fan apparatus for cooling an engine comprises a boss 1 for mounting purposes. The boss 1 is made up of bosses 2 and 3 opposing each other. Boss 1 is secured to any rotating means such as, for example, the shaft of the cooling water pump (not shown) of the engine (not shown). A pair of cylindrical holes 4 and 5 are formed at radially opposite sides of the boss 1. The axes of these holes are parallel but do not lie along one axis I—I. Rather, they are disposed along lines II—II and III—III on both sides of the axis I—I. Arms 6 and 7 are rotatably supported in and through the cylindrical holes 4 and 5, respectively. Blades 8 and 9 of the fan are secured to the outer ends of the arms 6 and 7 and are adapted to accept the force of the air pressure so as to decrease the angle of the blades 6 and 7 when the fan is rotating. In this embodiment, the blades are secured to the arms 6 and 7 such that a major portion of their surface trails their pivot axes during rotation which makes the angle of the blades of the fan small by the pressure produced during its rotation. Stoppers 10 and 11 are provided on the other ends of the arms 6 and 7 and bear against the inner surface of boss 1 to prevent a throwing of the arms by centrifugal force during rotation. Fittings 13 and 14 are axial extensions of the arms for securing a bimetal 12 between the arms 6 and 7 whereby the angle of the blades 8 and 9 is automatically adjusted or controlled in response to the environment conditions by means of both the spring action of the bimetal 12 and its temperature displacement or deformation.

From the abovementioned structure, in operation, when the speed of the rotation of the fan increases to high speed, the angle of the blades of the fan becomes small, because the spring strength of the bimetal 12 is overcome by the twisting moment of the pressure created by the eccentric mounting of the blades 8 and 9. Further, at this time, when the temperature of the radiator disposed at its forward portion increases when the engine temperature increases, the temperature of the bimetal is increased, whereby the angle of the blades increases. Conversely, when the temperature of the radiator lowers, and the blade angle decreases, whereby the power loss becomes less and fan operation less noisy due, to the small angle of the blades and small amount of air flow. In addition, when the temperature of the engine increases, an overheating is prevented by an increased amount of air flow. Also, when the speed of rotation of the engine decreases, the angle of the blades of the fan varies only through the effect of the displacement of the bimetal caused by temperature, since the pressure at low rotational speed is small. Accordingly, in case of the weather of a winter, at its starting of the engine, the fan may be set so as to not to blow any air, or even relatively warm air may be blown.

Referring now to FIG. 3, it shows a schematic diagram of the variation of blade angle in response to the temperature of the engine and the speed.

Blade 8 is disposed at standard position in normal environment and engine speed with angle $\theta$ from the lateral line on the drawing. When the temperature of the engine gets too high, the angle of the blades increases to the position 8a by the action of the bimetal, which increases the amount of the fluid flow through the radiator of the engine to increase cooling to lower the engine temperature. Conversely, when the engine temperature decreases, the angle of the blades becomes small to the position 8b of the blade 8 by the action of the bimetal, which decreases the amount of the fluid flow through the radiator of the engine to decrease the cooling to raise the engine temperature.

When the speed of the rotation of the engine decreases, the angle of the blades of the fan increases past the normal of $\theta$ to the position 8a. This happens due to the spring action of the bimetal. Inversely, when the speed of the rotation of the engine increases, the angle of the blades of the fan decreases to the position 8b, since the blade by the spring action of the bimetal is overcome by the twisting moment created by the eccentrically mounted blades in interacting with the air.

Referring now to FIGS. 4 and 5, which show sectional views of the bimetal and one blade in its relative position in operation.

In FIG. 4, when the temperature of the engine decreases, the angle of the blades becomes small by the action of the bimetal. When the temperature of the engine increases due to overload or excess engine speed, the angle of the blades becomes large (FIG. 5) by the action of the bimetal caused by passing hot air through the bimetal. As is shown in FIGURES 2, 4 and 5, the two ends of the bimetal are connected to the arms substantially at their rotation centers at their pivot axes. This provides the largest temperature response in the blades per unit movement of the bimetal.

What is claimed is:

1. A fan apparatus for cooling an engine, comprising a supporting means, two arms, means to pivot said arms on said supporting means, pivoting of said arms being about axes fixed relative to said supporting means, said arms extending oppositely along said axes outwards from said supporting means, fan blades connected to the outer ends of said arms, stopper means to prevent the arms from being thrown outwards by centrifugal force, said arms being extended inwardly to mutually adjoining positions, and a resilient, deformable bimetal connected between the mutually adjoining parts of said arms.

2. A fan apparatus as claimed in claim 1, the pivot axes of the arms being parallel and laterally spaced from one another, the arms being spaced laterally from one another.

3. A fan apparatus as claimed in claim 1, the supporting means having a predetermined rotation direction, the fan blades mounted eccentrically trailing the rotation direction, whereby a torque is created at high speed rotation to oppose the spring force of the bimetal to decrease blade angle.

4. A fan apparatus as claimed in claim 1, the bimetal connected substantially at the pivot axes of the arms.

5. A fan apparatus as claimed in claim 2, the supporting means having a predetermined rotation direction, the fan blades mounted eccentrically trailing the rotation direction, whereby a torque is created at high speed rotation to oppose the spring force of the bimetal to decrease blade angle.

References Cited

UNITED STATES PATENTS

| | | | |
|---|---|---|---|
| 2,114,567 | 4/1938 | Mercur. | |
| 2,213,582 | 9/1940 | Hall | 170—160.13 |
| 3,042,371 | 7/1962 | Fanti | 103—97 |
| 3,096,827 | 7/1963 | Woods | 170—160.13 |
| 3,373,930 | 3/1968 | Rom | 230—270 |

HENRY F. RADUAZO, *Primary Examiner.*

U.S. Cl. X.R.

123—41.12; 170—16.13; 236—35